United States Patent [19]

Otsubo et al.

[11] 4,133,331
[45] Jan. 9, 1979

[54] DUAL SPARK-PLUG IGNITION INTERNAL COMBUSTION ENGINE WITH IMPROVED COMBUSTION CHAMBER WALL

[75] Inventors: Kizuku Otsubo, Kokubunji; Tooru Yoshimura, Yokosuka; Akihiro Ohnishi, Kitamoto, all of Japan

[73] Assignee: Nissan Motor Company, Ltd., Japan

[21] Appl. No.: 776,483

[22] Filed: Mar. 10, 1977

[30] Foreign Application Priority Data

Mar. 11, 1976 [JP] Japan .................................. 51-26856

[51] Int. Cl.² .......................... F02M 7/00; F02P 1/00
[52] U.S. Cl. ............................ 123/148 C; 123/30 C; 123/119 A; 60/323
[58] Field of Search .......... 123/30 C, 325 A, 148 DS, 123/148 C, 169 PH, 193 H, 119 A; 60/323

[56] References Cited

U.S. PATENT DOCUMENTS

| 1,236,502 | 8/1917 | Tracy | 123/148 C |
| 1,847,612 | 3/1932 | Horning | 123/148 C |
| 2,025,202 | 12/1935 | Harper | 123/148 C |
| 2,257,631 | 9/1941 | Wahlberg | 60/323 |
| 2,469,448 | 5/1949 | Barber | 123/30 C |
| 3,809,042 | 5/1974 | Hosho | 123/148 C |

FOREIGN PATENT DOCUMENTS 755293 7/1954 United Kingdom ................ 123/148 C

*Primary Examiner*—Ronald B. Cox

[57] ABSTRACT

Two spark plugs are disposed in each combustion chamber of an internal combustion engine to ignite the air-fuel mixture mixed with a considerably large proportion of the exhaust gases. The wall surface of the combustion chamber is formed so that only one spark plug can not be excessively cooled down by the stream of the cool air-fuel mixture inducted through the intake port of the engine.

11 Claims, 4 Drawing Figures

DUAL SPARK-PLUG IGNITION INTERNAL COMBUSTION ENGINE WITH IMPROVED COMBUSTION CHAMBER WALL

BACKGROUND OF THE INVENTION

1. Field of the Invention

This invention relates, in general, to a dual spark-plug ignition internal combustion engine in which two spark plugs are disposed in each combustion chamber to ignite the air-fuel mixture mixed with a portion of the exhaust gases provided into the combustion chamber, and, more particularly, to the configuration of the wall surface of the combustion chamber of the same engine.

2. Description of the Prior Art

In order to suppress the generation of nitrogen oxide (NOx) during combustion of the air-fuel mixture in the combustion chambers of automotive internal combustion engines, it has already been proposed that two spark plugs are disposed spaced apart in the combustion chamber to ignite and combust an air-fuel mixture mixed with a considerably large proportion of the exhaust gases fed into the combustion chamber. In general, as the amount of the exhaust gas feed increases, the combustion time is prolonged and accordingly the engine running becomes unstable. However, by the effect of the above-mentioned two spark plug ignition, the combustion time of the mixture in the combustion chamber is shortened, causing stable and smooth running of the engine.

Furthermore, the thus arranged engine is required improve and stabilize the combustion in the combustion chamber in order to achieve further decrease of the emission level of NOx without deterioration of stable engine running.

SUMMARY OF THE INVENTION

It is the prime object of the present invention to provide an improved dual spark-plug ignition internal combustion engine in which faster combustion of the air-fuel mixture is achieved in the combustion chamber although a considerably large proportion of the exhaust gases is provided into the combustion chamber, causing NOx emission level to remarkedly decrease maintaining stable engine running.

Another object of the present invention is to provide an improved dual spark-plug ignition internal combustion engine in which two spark plugs disposed in each combustion chamber ignite the air-fuel mixture in the combustion chamber under the generally same temperature condition to equalize the combustion characteristics of the air-fuel mixture portions allotted respectively by the two spark plugs.

A further object of the present invention is to provide an improved dual spark-plug ignition internal combustion engine in which the wall surface of the combustion chamber is configurated such that the major stream of cool air-fuel mixture inducted into the combustion chamber never strike against the electrodes of a spark plug located on the path of the cool air-fuel mixture in order that one of the two spark plugs can not be excessively cooled down as compared with the other.

Other objects, features and advantages of the engine in accordance with the present invention will become more apparent from the following description of the preferred embodiments thereof taken in conjunction with the accompanying drawings in which like reference numerals and characters represent like parts and matters.

DESCRIPTION OF THE PREFERRED EMBODIMENT

Figure 1:
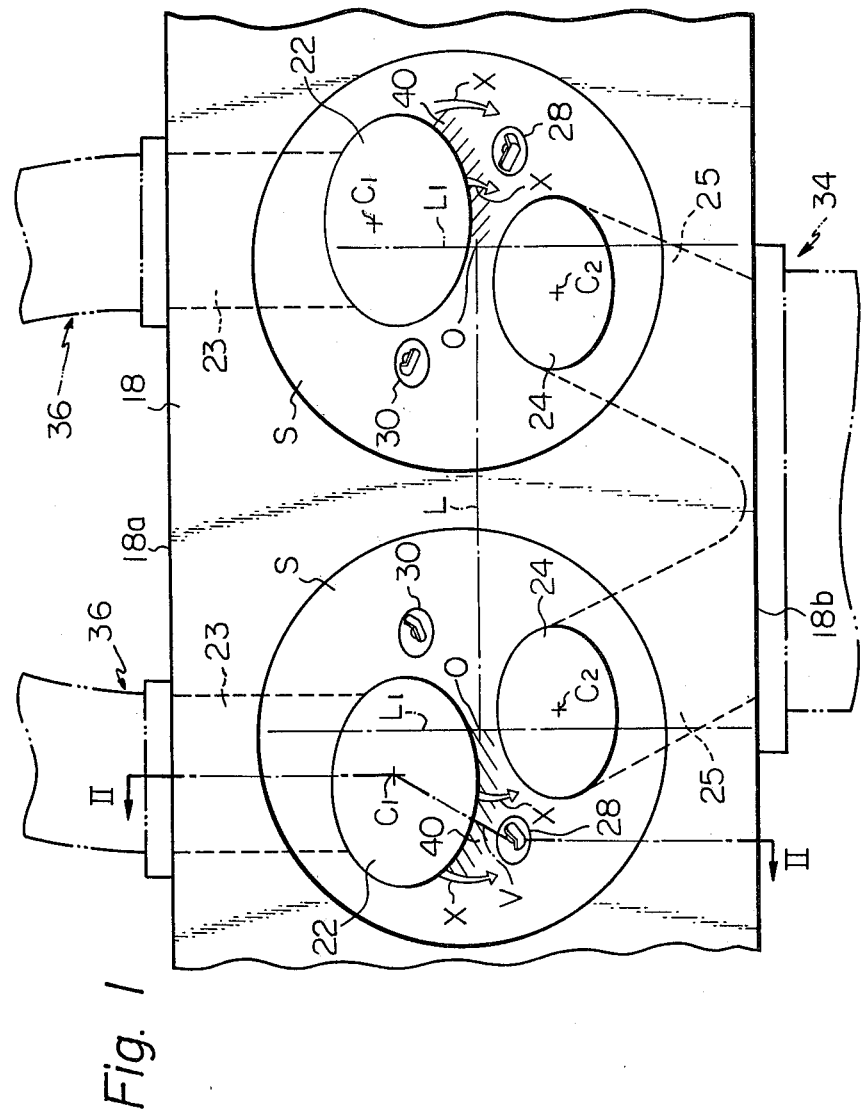
FIG. 1 is a schematic plan view of a part of the cylinder head of an internal combustion engine embodying the present invention.
Figure 2:
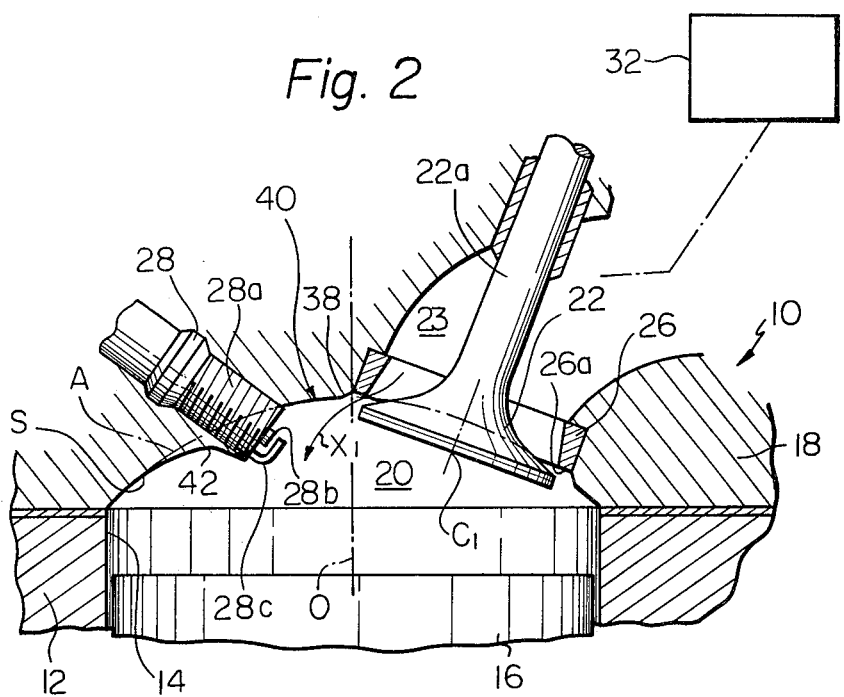
FIG. 2 is a cross-sectional view taken along the line II—II of FIG. 1, showing an example of the combustion chamber wall surface.

Referring now to FIGS. 1 and 2, a preferred embodiment of an internal combustion engine generally designated by the reference numeral 10 is shown as including an cylinder block 12. Formed in the cylinder block 12 is a cylinder 14 or cylinders in which a piston 16 or pistons are reciprocally movably disposed as customary. A cylinder head 18 is secured to the cylinder block 12. The cylinder head 18 is formed with a concavity (no numeral) of which surface S closes one or upper end of the cylinder bore and defines a combustion chamber 20 between the concavity surface S and the crown of the piston 16.

Intake and exhaust valve heads 22 and 24 are, as usual, seatably disposed on an annular intake valve seat 26 and an annular exhaust valve seat (not shown) which are secured to or embedded in the cylinder head 18. The intake valve seat 26 is formed with an annular flat surface 26a which is exposed to the combustion chamber 20 as shown. The intake valve head 22 is integral with a valve stem 22a which is slidably and movably disposed in a valve guide (no numeral) secured to the cylinder head 18. As shown in FIG. 1, the intake and exhaust valve heads 22 and 24 are located such that the centers $C_1$ and $C_2$ thereof lie opposite to each other with respect to a longitudinal vertical plane L. Additionally, the center $C_1$ and $C_2$ of the valve heads 22 and 24 lie opposite to each other with respect to a lateral vertical plane $L_1$. The centers $C_1$ and $C_2$ reside on the surfaces of the intake and exhaust valve heads 22 and 24, respectively, the surfaces being exposed to the combustion chamber 20. The longitudinal vertical plane L is parallel with the longitudinal axis (not shown) of the cylinder head and with the center axis O of the cylinder 14, passing through the center axis O of the cylinder or the center axes of the cylinders. The lateral vertical plane $L_1$ is perpendicular to the longitudinal vertical plane L and parallel with the cylinder center axis O, passing through the cylinder center axis O. Furthermore, the centers $C_1$ and $C_2$ of the intake and exhaust valve heads 22 and 24 are spaced apart from the cylinder center axis O in the direction opposite to each other along the plane L in order to increase the diameters of the intake and exhaust valves resulting higher volumetric and scavenging efficiencies.

The reference numeral 23 is an intake port formed in the cylinder head 18 and communicable with the combustion chamber 20 through the opening formed through the annular intake valve seat 26. The reference numeral 25 indicates a so-called siamesed exhaust port formed in the cylinder head 18. The siamesed exhaust port 25 is shared by adjacent two combustion chambers 20 and accordingly is communicable with adjacent two combustion chambers through the two exhaust valve seats (not shown) disposed respectively in the adjacent two combustion chambers 20.

It is to be noted that this engine 10 employs a so-called cross-flow induction-exhaust arrangement in which the intake port 23 opens to one side surface 18a of the cylinder head, while the exhaust port 25 opens to the opposite side surface 18b of the same. In this case, the intake port 23 is arranged such that the longitudinal axis (not shown) thereof crosses the longitudinal axis of the cylinder head 18 as viewed from the direction of the cylinder center axis O. It will be understood that, by this cross-flow induction-exhaust arrangement and the above-mentioned locations of the intake and exhaust valves, the air-fuel mixture inducted through the intake port 23 into the combustion chamber 20 is forced to rotate in the direction indicted by arrows X in FIG. 1, generating swirl turbulences of the air-fuel mixture in the combustion chamber 20.

First and second spark plugs 28 and 30 are disposed in the combustion chamber 20. The first spark plug 28 is composed of a threaded portion 28a by which the spark plug is secured to the cylinder head 18 in such a manner that the center and side electrodes 28b and 28c are projected into the combustion chamber 20. The electrodes 28b and 28c are, as usual, mounted on the tip surface of the threaded portion 28a and defines therebetween a spark gap (no numeral). The spark gap is located to be projected into the combustion chamber 20 from the base surface A of the concavity toward the central portion of the combustion chamber 20. The concavity base surface A is of a hemispherical shape since the upper surface of the combustion chamber 20 defined by the cylinder head 18 is of hemispherical shape in this case. It will be understood that the second spark plug 30 is arranged similar to the first spark plug 28. As clearly shown in FIG. 1, the first and second spark plugs 28 and 30 are located so that the midpoints of the spark gaps thereof lie opposite to each other with respect to the longitudinal vertical plane L and with respect to the lateral vertical plane $L_1$. Additionally, the midpoints of the spark gaps of the first and second spark plugs 28 and 30 are generally opposite and symmetrical with respect to the cylinder center axis O. Furthermore, the midpoint of the spark gap of the first spark plug 28 is opposite to the center $C_1$ of the intake valve head 22 with respect to the longitudinal vertical plane L, while the midpoint of the spark gap of the second spark plug 30 is opposite to the center $C_2$ of the exhaust valve head 24 with respect to the plane L.

Designated by the reference numeral 32 is a device or means for providing the exhaust gases of the exhaust system 34 into the combustion chamber 20 through the intake system 36 of the engine. The exhaust gas providing device 32 is arranged to provide the combustion chamber with the exhaust gases in the maximum amount ranging from 25 to 40% by volume of the intake air inducted into the combustion chamber 20 through the intake system 36.

As best seen from FIG. 2, in this case, the intake valve seat 26 is located so that the annular flat surface 26a thereof sunk from the extension of the concavity surface S in the direction opposite to the combustion chamber 20 to form a wall surface 38 connecting the annular flat surface 26a of the valve seat 26 and the concavity surface S. The wall surface 38 is formed in a manner that an angle made between the cross-section thereof and the cylinder center axis O is larger than that made between the tangent line (not shown) of the cross-section of the concavity surface S and the cylinder center axis O. The tangent line is at a point where the cylinder center axis O crosses the cross-section of the surface S. The cross-sections of the wall surface 38 and the concavity surface S is taken along an imaginary vertical plane V passing through the center $C_1$ of the intake valve head 22 and the midpoint of the spark gap of the first spark plug 28, the vertical plane V being parallel with the cylinder center axis O. In this case, the cross-section of the wall surface 38 is arranged to cross the tangent line of the cross-section of the concavity surface S at an angle near 90 degrees. It is to be noted that the concavity surface S lies generally or substantially on the base surface A of the concavity.

The wall surface 38 constitutes a particular concavity surface portion 40 or means for preventing the air-fuel mixture inducted into the combustion chamber 20 to directly strike against the electrodes 28b and 28c of the first spark plug 28. The concavity surface portion 40 is located as shown by oblique lines in FIG. 1, i.e., the surface portion 42 lies between the annular intake valve seat 26 and the first spark plug 28. In this case, the first spark plug 28 is secured to a boss portion 42 or a portion 42 for receiving the first spark plug 28 in such a manner that almost all the tip surface of the threaded portion 28a is projected from the concavity surface S into the combustion chamber 20. It is to be noted that the electrodes of the first spark plug 28 are located on the path of the air-fuel mixture inducted through the intake port 23 as viewed from the direction of the cylinder center axis O or in the drawing of FIG. 1.

With the arrangement hereinbefore described, the cool air-fuel mixture inducted through the intake port 23 into the combustion chamber 20 flows in the direction of the arrows X as viewed from the cylinder center axis O as shown in FIG. 1. However, when viewed from the direction of the longitudinal axis of the cylinder head 18, the air-fuel mixture flows in the direction of an arrow $X_1$ as shown in FIG. 2. This results from the fact that a major stream of the air-fuel mixture inducted through the opening of the intake valve seat 26 dashes against the wall surface 38 formed under the intake valve seat 26 to shift the flow direction of the major stream of the air-fuel mixture inducted into the combustion chamber 20. Accordingly, the major stream of the cool air-fuel mixture is prevented from directly striking against the electrodes 28b and 28c of the first spark plug 28 and therefore the electrodes of the first spark plug 28 are not excessively cooled down. As a result, it is prevented that only electrodes of the first spark plug 28 are excessively cooled down by the cool air-fuel mixture as compared with the electrodes of the second spark plug 30 which is located out of the path of the cool air-fuel mixture inducted through the intake port 23. This causes the both first and second spark plugs 28 and 30 to put generally under the same temperature condition and therefore the ignition characteristics of the first and second spark plugs 28 and 30 are maintained generally the same. It will be understood that these same ignition characteristics of the first and second spark plugs 28 and 30 result in the advantages in which the intensities and the timings of the sparks generated from the first and second spark plugs 28 and 30 are generally same, causing the generally same combustion characteristics of air-fuel mixture portions alloted respectively by the first and second spark plugs 28 and 30. This achieves faster combustion of the air-fuel mixture in the combustion chamber 20 although a considerably large proportion of the exhaust gases is provided into the combustion chamber 20 to mix with the air-fuel mixture inducted into the combustion chamber 20. As is apparent from the foregoing discussion, in the engine 10 according to the present invention, the emission level of nitrogen oxides (NOx) is remarkedly decreased maintaining stable and smooth engine running.

Figure 3:
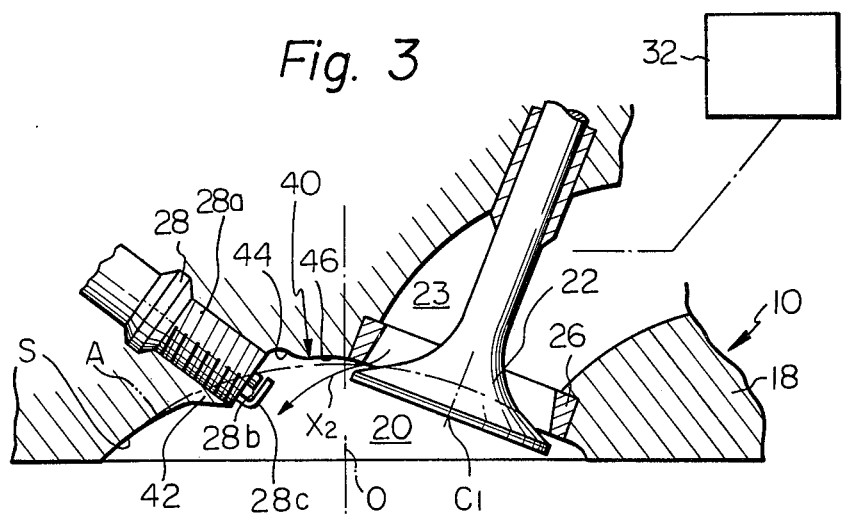
FIG. 3 is a cross-sectional view similar to FIG. 2, but showing another example of the combustion chamber wall surface.

FIG. 3 illustrates another example of the particular concavity surface portion 40 according to the present invention, for preventing the air-fuel mixture inducted into the combustion chamber 20 to directly strike against the electrodes 28b and 28c of the first spark plug 28. As shwon, the concavity surface S of the cylinder head 18 is formed with a depressed portion 44 between the intake valve seat 26 and the first spark plug 28. This depressed portion 44 constitutes the particular concavity surface 40. In this case, the depressed portion 44 is used as the portion 42' for receiving the first spark plug 28. Accordingly, as clearly shown, the first spark plug 28 is located in such a manner that at least a part of the tip surface of the threaded portion 28a of the first spark plug 28 is sunk from the extension of the concavity surface S in the direction opposite to the combustion chamber 20. However, the spark gap defined between the electrodes 28b and 28c is located to be projected from the base surface A toward the central portion of the combustion chamber 20.

With this arrangement, the cool air-fuel mixture inducted through the opening of the intake valve seat 27 flows into the combustion chamber 20 in the direction of an arrow $X_2$ and therefore the major stream of the air-fuel mixture is prevented from directly striking against the electrodes of the first spark plug 28. As a result, it is prevented that the electrodes of only the first spark plug 28 is excessively cooled down by the effect of the cool air-fuel mixture supplied through the intake port 23. It will be understood from the foregoing that this arrangement can produce the same effects and results as in the arrangement of FIG. 2.

It is to be appreciated that the effects resulted from the above-mentioned arrangement can be further improved by protruding a portion 46 of the concavity surface residing between the intake valve seat 26 and the depressed portion 44 to an extend which does not lead to any other disadvantage.

Figure 4:
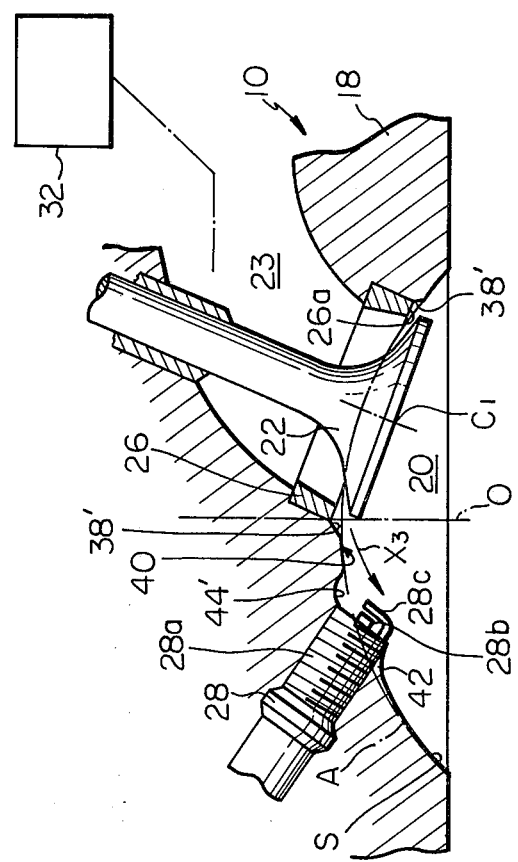
FIG. 4 is a cross-sectional view similar to FIG. 2, but showing a further example of the combustion chamber wall surface.

FIG. 4 illustrates a further example of the particular concavity surface portion 40 according to the present invention, for preventing the air-fuel mixture inducted into the combustion chamber to directly strike against the electrodes of the first spark plug 28. In this case, the intake valve seat 26 is located so that the annular flat surface 26a thereof sunk as shown in FIG. 2 to form the wall surface 38' connecting the annular flat surface 26a of the valve seat 26 and the concavity surface S of the cylinder head 18. The wall surface 38' is configurated similar to the wall surface 38 of the arrangement in FIG. 2. Additionally, the concavity surface S is formed with the depressed portion 44' between the valve seat 26 and the first spark plug 28. Accordingly, the first spark plug 28 is located such that at least a part of the tip surface of the threaded portion 28a thereof is sunk from the extension of the concavity surface S in the same manner as in the case of FIG. 3. However, the spark gap defined between the electrodes 28b and 28c is located to be projected from the base surface A toward the central portion of the combustion chamber 20.

It will be understood that this arrangement is effective when sufficient effects according to the present invention are not obtained by the arrangement in FIG. 2 or in FIG. 3, due to variations of the location and the direction of the intake port 23 and of the curvature of the concavity surface S of the combustion chamber 20.

With the arrangement of FIG. 4, the air-fuel mixture inducted into the combustion chamber 20 is directed downward as indicated by an arrow $X_3$ by the effect of the wall surface 38', preventing the electrodes of the first spark plug 28 from being directly struck by the major stream of the cool air-fuel mixture inducted through the intake valve seat 26. Even if the downward directional guidance of the air-fuel mixture is insufficient, the electrodes of the first spark plug 28 are never directly struck by the major stream of the cool air-fuel mixture inducted into the combustion chamber 20 since the electrodes of the first spark plug 28 are considerably withdrawn toward the wall surface of the cylinder head 18.

What is claimed is:

1. An induction combustion engine consisting:

a cylinder head secured to a cylinder block in which a cylinder is formed, said cylinder head being formed with a concavity of which surface closes one end of the cylinder and defines thereinside a combustion chamber which is communicable with an intake port formed in said cylinder head, an air-fuel mixture being provided through said intake port and following a predetermined path through said combustion chamber;

means for providing exhaust gases into the combustion chamber;

an annular intake valve seat on which an intake valve head is seatable, said annular intake valve seat being secured to said cylinder head and formed with an annular flat surface which is exposed to the combustion chamber, the combustion chamber being communicable with an intake port through the opening formed through said annular intake valve seat;

first and second spark plugs disposed in the combustion chamber, each spark plug being composed of a threaded portion by which the spark plug is secured to said cylinder head, and two electrodes mounted on the tip surface of the threaded portion which tip surface is exposed to the combustion chamber, said first spark plug being located on the path of the air-fuel mixture inducted into the combustion chamber through the intake port; and means for preventing the air-fuel mixture inducted into the combustion chamber to directly strike against the electrodes of said first spark plug, the preventing means being formed with a portion of the concavity surface of said cylinder head which portion lying between said annular intake valve seat and said first spark plug; said air-fuel mixture flow being first directed towards said first spark plug and subsequently towards said second spark plug.

2. An internal combustion engine as claimed in claim 1, in which the preventing means includes a wall surface connecting the annular flat surface of said annular intake valve seat, the annular flat surface being sunk from the extension of the concavity surface of said cylinder head in the direction opposite to the combustion chamber, an angle made between the cross-section of said wall surface and the center axis of the cylinder being larger than that made between the tangent line of the cross-section of the concavity surface and the cylinder center axis, the cross-sections of said wall surface and the concavity surface being taken along an imaginary vertical plane passing through the center of the intake valve and the midpoint of the spark gap defined between two electrodes of said first spark plug, said imaginary vertical plane being parallel with the cylinder center axis, said tangent line being at a point where the cylinder center axis crosses the cross-section of concavity surface.

3. An internal combustion engine as claimed in claim 1, in which the preventing means includes a depressed portion of the concavity surface of said cylinder head, said first spark plug being secured, at its threaded portion, to said depressed portion such that at least a part of the tip surface of the threaded portion thereof is sunk from the extension of the concavity surface in the direction opposite to the combustion chamber.

4. An internal combustion engine as claimed in claim 1, in which the preventing means includes:
   a wall surface connecting the annular flat surface of said annular intake valve seat, the annular flat surface being sunk from the extension of the concavity surface of said cylinder head in the direction opposite to the combustion chamber, an angle made between the cross-section of said wall surface and the center axis of the cylinder being larger than that made between the tangent line of the cross-section of the concavity surface and the cylinder center axis, the cross-sections of said wall surface and the concavity surface being taken along an imaginary vertical plane passing through the center of the intake valve and the midpoint of the spark gap defined between two electrodes of said first spark plug, said imaginary vertical plane being parallel with the cylinder center axis, said tangent line being at a point where the cylinder center axis crosses the cross-section of concavity surface; and
   a depressed portion of the concavity surface of said cylinder head, said first spark plug being secured, at its threaded portion, to said depressed portion such that at least a part of the tip surface of the threaded portion thereof is sunk from the extension of the concavity surface in the direction opposite to the combustion chamber.

5. An internal combustion engine as claimed in claim 1, in which said cylinder head employs a cross-flow induction-exhaust arrangement, in which the intake valve and an exhaust valve disposed in the combustion chamber are located such that the centers thereof lie opposite with respect to a longitudinal vertical plane parallel with the longitudinal axis of said cylinder head and with respect to the center axis of the cylinder, passing through the center axis of the cylinder, the centers of the intake and exhaust valves lying spaced apart in the opposite direction from a lateral vertical plane perpendicular to the longitudinal vertical plane and passing through the cylinder center axis, in which said first and second spark plugs are located such that the respective midpoints of the spark gaps defined between the electrodes thereof lie opposite with respect to the lateral vertical plane, the midpoint of the spark gap of said first spark plug and the center of said intake valve head lying opposite with respect to the longitudinal vertical plane, and the midpoint of the spark gap of said second spark plug and the center of said exhaust valve head lying opposite with respect to the longitudinal vertical plane.

6. An internal combustion engine as claimed in claim 5, in which said first and second spark gaps are located such that the midpoints of the spark gaps thereof are lie generally symmetrically with respect to the cylinder center axis.

7. An internal combustion engine as claimed in claim 6, in which said first and spark plugs are located such that the midpoints of the spark gaps thereof are projected toward the central portion of the combustion chamber from the concavity surface defining the combustion chamber of a hemispherical shape.

8. An internal combustion engine as claimed in claim 7, in which the preventing means includes a wall surface connecting the annular flat surface of said annular intake valve seat, the annular flat surface being sunk from the extension of the concavity surface of said cylinder head in the direction opposite to the combustion chamber, an angle made between the cross-section of said wall surface and the center axis of the cylinder being larger than that made between the tangent line of the cross-section of the concavity surface and the cylinder center axis, the cross-sections of said wall surface and the concavity surface being taken along an imaginary vertical plane passing through the center of the intake valve and the midpoint of the spark gap defined between two electrodes of said first spark plug, said imaginary vertical plane being parallel with the cylinder center axis, said tangent line being at a point where the cylinder center axis crosses the cross-section of concavity surface.

9. An internal combustion engine as claimed in claim 7, in which the preventing means includes a depressed portion of the concavity surface of said cylinder head, said first spark plug being secured, at its threaded portion, to said depressed portion such that at least a part of the tip surface of the threaded portion thereof is sunk from the extension of the concavity surface in the direction opposite to the combustion chamber.

10. An internal combustion engine as claimed in claim 7, in which the preventing means includes:
   a wall surface connecting the annular flat surface of said annular intake valve seat, the annular flat surface being sunk from the extension of the concavity surface of said cylinder head in the direction opposite to the combustion chamber, an angle made between the cross-section of said wall surface and the center axis of the cylinder being larger than that made between the tangent line of the cross-section of the concavity surface and the cylinder center axis, the cross-section of said wall surface and the concavity surface being taken along an imaginary vertical plane passing through the center of the intake valve and the midpoint of the spark gap defined between two electrodes of said first spark plug, said imaginary vertical plane being parallel with the cylinder center axis, said tangent line being at a point where the cylinder center axis crosses the cross-section of concavity surface; and
   a depressed portion of the concavity surface of said cylinder head, said first spark plug being secured, at its threaded portion, to said depressed portion such that at least a part of the tip surface of the threaded portion thereof is sunk from the extension of the concavity surface in the direction opposite to the combustion chamber.

11. An internal combustion engine as claimed in claim 7, in which the exhaust gas providing means is arranged to provide the combustion chamber with the exhaust gases in the maximum amount ranging from 25 to 40% by volume of intake air inducted into the combustion chamber.

* * * * *